(12) United States Patent
Kawamura et al.

(10) Patent No.: US 10,146,523 B2
(45) Date of Patent: Dec. 4, 2018

(54) IMAGE PROCESSING APPARATUS, DISTRIBUTION SERVER, MANAGEMENT SERVER, AND COMPUTER READABLE STORAGE MEDIUM

(71) Applicant: Konica Minolta, Inc., Chiyoda-ku, Tokyo (JP)

(72) Inventors: Yuji Kawamura, Toyokawa (JP); Yoichi Kurumasa, Toyokawa (JP); Mie Kawabata, Toyokawa (JP); Kentaro Nagatani, Toyokawa (JP); Jun Kunioka, Okazaki (JP); Hiroshi Sugiura, Toyokawa (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 246 days.

(21) Appl. No.: 15/079,491

(22) Filed: Mar. 24, 2016

(65) Prior Publication Data
US 2016/0291963 A1 Oct. 6, 2016

(30) Foreign Application Priority Data
Mar. 31, 2015 (JP) ................... 2015-073131

(51) Int. Cl.
*G06F 9/445* (2018.01)
*G06F 8/65* (2018.01)
*H04N 1/00* (2006.01)

(52) U.S. Cl.
CPC ........... *G06F 8/65* (2013.01); *H04N 1/00015* (2013.01); *H04N 1/00023* (2013.01);
(Continued)

(58) Field of Classification Search
None
See application file for complete search history.

(56) References Cited

U.S. PATENT DOCUMENTS

| 7,876,469 B2 * | 1/2011 | Hanada ................ G06F 8/65 358/1.13 |
| 9,538,035 B2 | 1/2017 | Minamino |

(Continued)

FOREIGN PATENT DOCUMENTS

| JP | 2005-092803 A | 4/2005 |
| JP | 2006-331494 A | 12/2006 |

(Continued)

OTHER PUBLICATIONS

Office Action (Notice of Grounds of Rejection) dated Mar. 21, 2017, by the Japanese Patent Office in mrresponding Japanese Patent Application No. 2015-073131, and an English Translation of the Office Action. (7 pages).

*Primary Examiner* — Insun Kang
(74) *Attorney, Agent, or Firm* — Buchanan Ingersoll & Rooney PC

(57) ABSTRACT

An image processing apparatus is provided. Firmware customized for a user who uses the image processing apparatus has been installed in advance in the image processing apparatus. The image processing apparatus has a hardware processor configured to monitor a condition of use of the image processing apparatus and determine whether or not the monitored condition of use is a condition of use adapted to the customized firmware, and to perform processing for updating to the latest standard firmware when it is determined that the monitored condition of use departs from the condition of use adapted to the customized firmware.

35 Claims, 15 Drawing Sheets

(52) U.S. Cl.
CPC ..... *H04N 1/00042* (2013.01); *H04N 1/00079* (2013.01); *H04N 1/00206* (2013.01); *H04N 1/00344* (2013.01); *H04N 2201/0094* (2013.01)

(56) References Cited

U.S. PATENT DOCUMENTS

| | | | | |
|---|---|---|---|---|
| 2005/0007609 A1* | 1/2005 | Itagaki | ............... | H04N 1/40068 358/1.9 |
| 2005/0141025 A1* | 6/2005 | Hanada | ............... | G06F 8/65 358/1.15 |
| 2006/0221372 A1* | 10/2006 | Onishi | ............... | G06F 3/1204 358/1.13 |
| 2008/0040712 A1* | 2/2008 | Tanaka | ............... | G06F 8/65 717/168 |
| 2008/0263540 A1* | 10/2008 | Bando | ............... | G06F 8/68 717/173 |
| 2009/0225346 A1* | 9/2009 | Tokuda | ............... | G06F 3/1205 358/1.13 |
| 2010/0199271 A1* | 8/2010 | Harada | ............... | G06F 8/61 717/168 |
| 2010/0220358 A1* | 9/2010 | Beninato | ............... | H04L 51/066 358/1.15 |
| 2011/0173603 A1* | 7/2011 | Nakamura | ............... | G06F 8/65 717/173 |
| 2013/0042230 A1* | 2/2013 | Little | ............... | G06F 8/65 717/173 |
| 2014/0282481 A1* | 9/2014 | Ohara | ............... | G06F 8/65 717/172 |
| 2014/0355049 A1* | 12/2014 | Hadano | ............... | G06F 3/123 358/1.15 |
| 2015/0154014 A1* | 6/2015 | Adachi | ............... | G06F 8/65 717/169 |
| 2015/0169257 A1* | 6/2015 | Nishikawa | ............... | G06F 8/60 717/172 |
| 2015/0363185 A1* | 12/2015 | Garratt | ............... | G06F 8/65 717/168 |
| 2016/0098256 A1* | 4/2016 | Tehrani | ............... | G06F 8/36 717/107 |
| 2017/0324873 A1* | 11/2017 | Michishita | ............... | H04N 1/00 |

FOREIGN PATENT DOCUMENTS

| | | |
|---|---|---|
| JP | 2011-204239 A | 10/2011 |
| JP | 2012-221197 A | 11/2012 |
| JP | 2012-242980 A | 12/2012 |
| JP | 2016118846 A | 6/2016 |

* cited by examiner

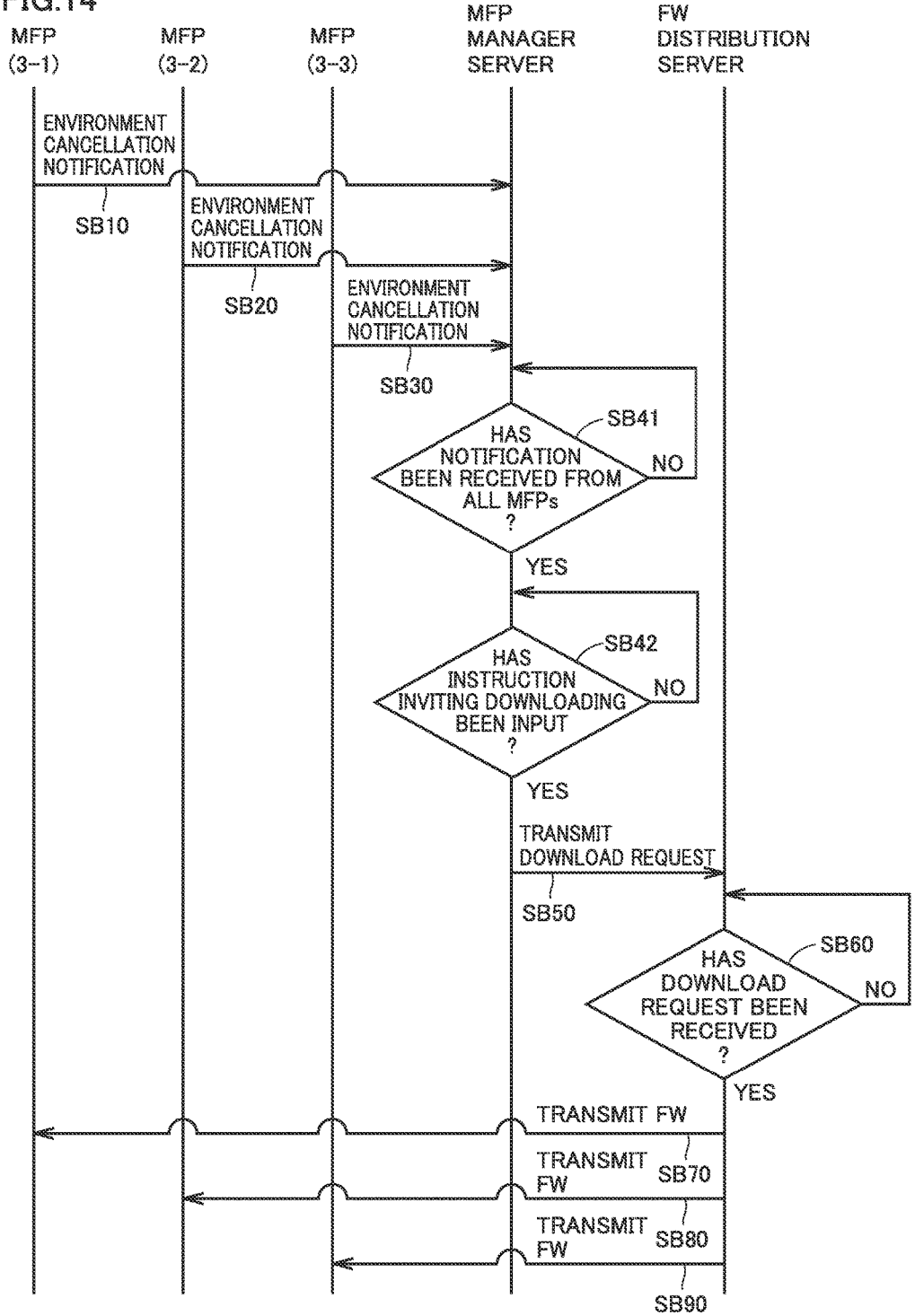

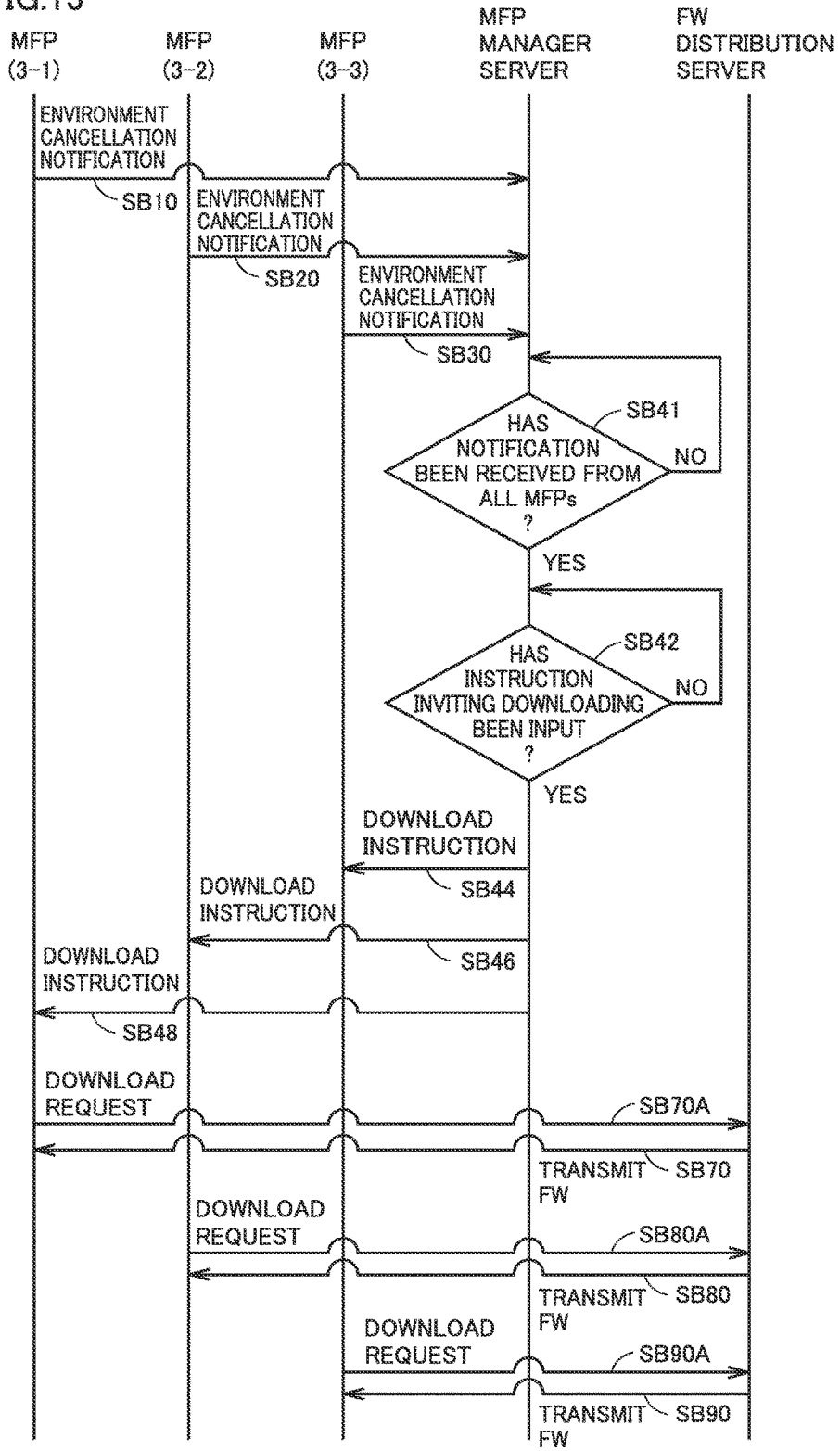

IMAGE PROCESSING APPARATUS, DISTRIBUTION SERVER, MANAGEMENT SERVER, AND COMPUTER READABLE STORAGE MEDIUM

This application is based on Japanese Patent Application No. 2015-073131 filed with the Japan Patent Office on Mar. 31, 2015, the entire content of which is hereby incorporated by reference.

BACKGROUND OF THE INVENTION

Field of the Invention

The present disclosure relates to an image processing apparatus in which firmware has been installed, a distribution server and a management server capable of communicating with such an image processing apparatus, and a computer readable storage medium.

Description of the Related Art

Firmware (hereinafter also denoted as appropriate as "FW") installed in an image processing apparatus such as a multi-function machine such as a multi-functional peripheral (MFP) has conventionally been standard FW conforming to all machines. Even though FW common to all machines has thus been installed, needs of users have been fulfilled.

Recently, however, demands from users have become diversified, and even in the same user (for example, a company), a form of use of an image processing apparatus is often significantly different for each department in the user. Thus, standard FW often does not fulfill the demands from individual users.

In order to address such a situation, in some image processing apparatuses, a plurality of installed applications are individually revised and selected depending on a situation. Needs of a user to use equipment in its own special environment tend to increasingly be high, and consequently, mere revision and selection of some applications cannot meet the needs. Namely, needs of the user cannot be met when various modifications are not made on the entire FW. In order to meet such needs, separately from standard FW, customized FW modified to be tailored to a form of use by the user has been released.

Various techniques have been proposed for updating to a program in equipment.

For example, Japanese Laid-Open Patent Publication No. 2006-331394 discloses a technique for computing an importance of modifications to a current program to the latest program based on improvement in functionality resulting from addition of the functionality, improvement in stability resulting from fixing of troubles, a range affected by the modifications (breadth of the affected range), and an amount of the modifications (the possibility of being affected), and performing or prompting update to the latest program when the importance of modifications exceeds a predetermined threshold value.

Japanese Laid-Open Patent Publication No. 2005-092803 discloses a system that dynamically assigns a plurality of pieces of software to a plurality of servers to perform customer services. In the system, in order to appropriately apply revision information to software, an index to which there have been integrated the newness of a customer's software and the security level of the software is calculated by using information provided at the time of issuance of the revision information. If the calculated index does not satisfy restricting conditions designated by a customer, revision information is applied to the software. The software is thus updated.

Japanese Laid-Open Patent Publication No. 2012-242980 discloses an image formation apparatus obtaining the latest firmware corresponding to an image formation control module from a data server through a network connection portion with start of update of firmware stored in at least one control module based on update firmware stored in a portable storage medium and automatically updating the firmware stored in the image formation control module to the latest version.

Japanese Laid-Open Patent Publication No. 2012-221197 discloses a system including various means used for registering firmware for an image formation apparatus in a distribution server. The system includes means for searching for a product code tied to firmware to be registered, means for searching for the latest firmware tied to the product code, means for determining whether or not a type of the latest firmware is appropriate, means for taking over update setting of the latest firmware if the type of the latest firmware is appropriate, means for searching for the second latest firmware if the type of the latest firmware is not appropriate, means for changing update setting depending on a type of the firmware when the type of the firmware to be registered is changed, and means for checking compatibility of update setting as to the firmware to be registered and all versions of firmware already registered in the distribution server.

Japanese Laid-Open Patent Publication No. 2011-204239 discloses a method for upgrading firmware of an image forming apparatus using a print controlling terminal device. The method includes the steps of receiving information on firmware installed in the image forming apparatus, identifying whether there exists a firmware version newer or later than that installed in the image forming apparatus using the received firmware information, determining whether the firmware of the newer or latest version is compatible with a program installed in the print controlling terminal device using compatibility information when firmware of the newer or latest version exists, receiving the firmware of the newer or latest version from a firmware providing server according to the compatibility determination result, and upgrading firmware of the image forming apparatus using the received firmware of the newer or latest version.

Updating customized FW at an appropriate frequency like a frequency for standard FW, however, is difficult from a point of view of labor and cost of a manufacturer, because, for example, the number of image processing apparatuses to which customized FW is adapted is considerably smaller than the number of multi-function machines to which the standard FW is adapted.

Consequently, a user who uses the multi-function machine in which customized FW has been installed often has to continue to use the FW having a potential bug or inconvenient specifications, and suffers from a defective condition in terms of quality.

SUMMARY OF THE INVENTION

In view of the circumstances above, promoted use of standard firmware in an image processing apparatus in which customized firmware had been installed has been demanded.

According to one aspect of the present disclosure, an image processing apparatus in which firmware customized for a user who uses the image processing apparatus has been installed in advance is provided. The image processing apparatus has a hardware processor configured to monitor a condition of use of the image processing apparatus and determine whether or not the monitored condition of use is a condition of use adapted to the customized firmware, and to perform processing for updating to the latest standard firmware when the monitored condition of use is determined as departing from the condition of use adapted to the customized firmware.

According to another aspect of the present disclosure, a distribution server for updating firmware installed in an image processing apparatus is provided. The distribution server has a hardware processor configured to monitor a condition of use of the image processing apparatus and determine whether or not the monitored condition of use is a condition of use adapted to customized firmware, and to perform processing for updating to the latest standard firmware in the image processing apparatus when the monitored condition of use is determined as departing from the condition of use adapted to the customized firmware.

According to yet another aspect of the present disclosure, a management server for managing an image processing apparatus in which firmware has been installed is provided. The management server has a hardware processor configured to monitor a condition of use of the image processing apparatus and determine whether or not the monitored condition of use is a condition of use adapted to customized firmware, and to perform processing for updating to the latest standard firmware in the image processing apparatus when the monitored condition of use is determined as departing from the condition of use adapted to the customized firmware.

According to yet another aspect of the present disclosure, a non-transitory computer-readable storage medium storing a program executed by a computer of an image processing apparatus is provided. The program causes the computer to monitor a condition of use of the image processing apparatus and determine whether or not the condition of use is a condition of use adapted to customized firmware, and to perform processing for updating to the latest standard firmware when the condition of use is determined as departing from the condition of use.

According to yet another aspect of the present disclosure, a non-transitory computer-readable storage medium storing a program executed by a computer of a distribution server for updating firmware installed in an image processing apparatus is provided. The program causes the computer to monitor a condition of use of the image processing apparatus and determine whether or not the condition of use is a condition of use adapted to customized firmware, and to perform processing for updating to the latest standard firmware in the image processing apparatus when the condition of use is determined as departing from the condition of use.

According to yet another aspect of the present disclosure, a non-transitory computer-readable storage medium storing a program executed by a computer of a management server for managing an image processing apparatus in which firmware has been installed is provided. The program causes the computer to monitor a condition of use of the image processing apparatus and determine whether or not the condition of use is a condition of use adapted to customized firmware, and to perform processing for updating to the latest standard firmware in the image processing apparatus when the condition of use is determined as departing from the condition of use.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram showing a sequence in processing in the image processing system in a fourth embodiment.

FIG. 15 is a diagram showing a sequence in processing performed in the image processing system in a fifth embodiment.

DESCRIPTION OF THE PREFERRED EMBODIMENTS

Figure 1:
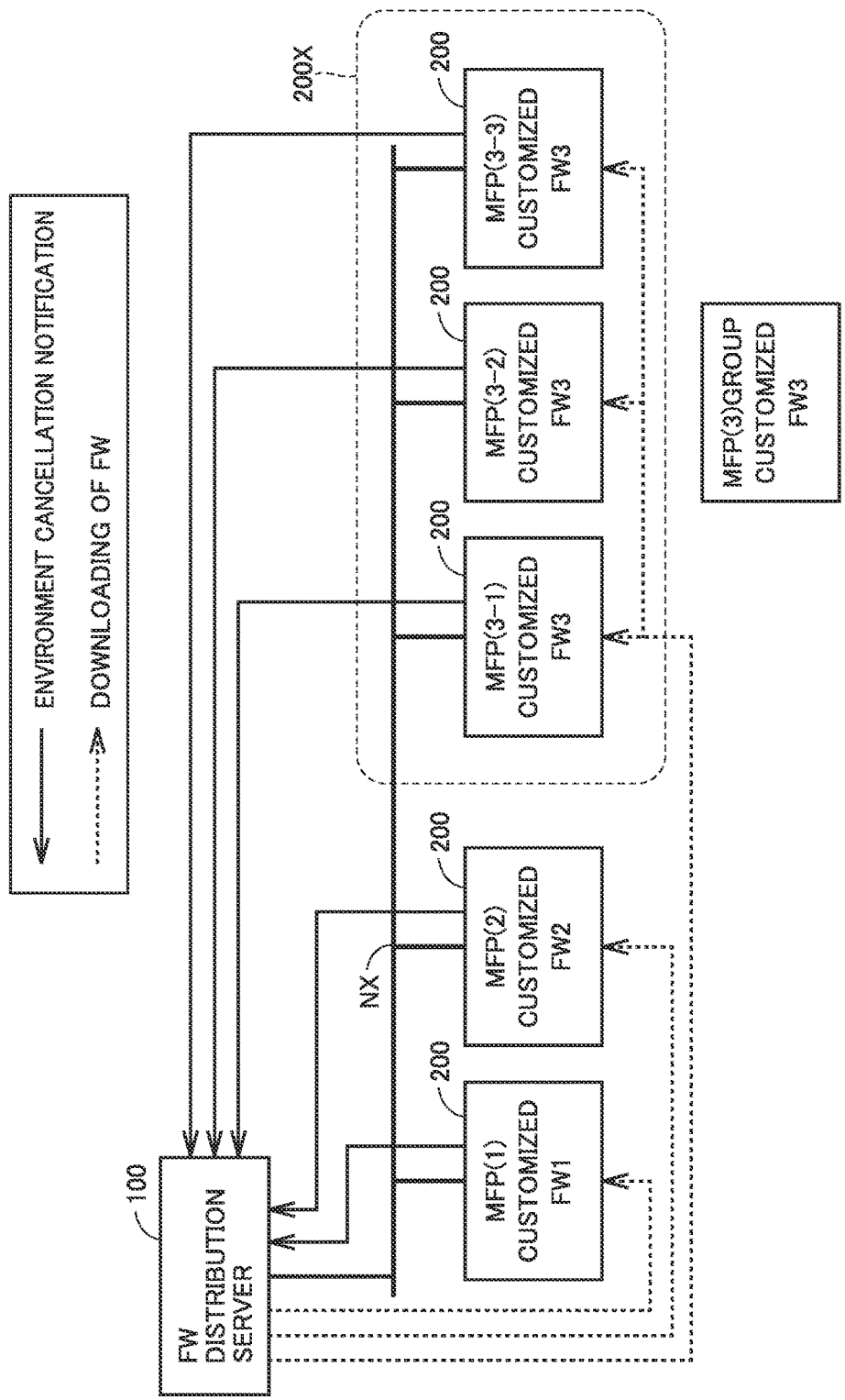
FIG. 1 is a diagram showing one example of an overall configuration of a first embodiment of an image processing system.

An embodiment of an image processing system will be described hereinafter with reference to the drawings. In the description below, the same elements and components have the same reference characters allotted. Their label and function are also identical. Therefore, description thereof will not be repeated.

First Embodiment (1) Configuration of Image Processing System

An image processing system shown in FIG. 1 includes an FW distribution server 100 and five MFPs 200. These can give a notification to one another through a network NX. The number "5" of MFPs 200 shown in FIG. 1 is by way of example and limitation thereto is not intended.

In the image processing system in FIG. 1, firmware for each of various functions such as a printing function or for implementing two or more functions has been installed in each MFP 200. Firmware installed in MFP 200 includes firmware installed in common to a large number of MFPs 200 (hereinafter also referred to as "standard FW") and firmware customized to an environment of use of one (or a few) MFP(s) (hereinafter also referred to as "customized FW").

A difference between customized FW and standard FW corresponds to an environment of use of MFP 200 in which the customized FW has been installed. More specifically, for example, customized FW which has a warning about near empty issued under such a condition that the remaining number of sheets of paper is larger than that associated with standard FW is installed in MFP 200 which is used in a manner satisfying an environment of use in which "a frequency of use of printing paper is high."

Each MFP 200 determines whether or not an environment for using customized FW (an environment of use) has been established in that MFP 200. Thereafter, when it determines that the environment has not been established, MFP 200 notifies FW distribution server 100 of that fact as shown with a solid line in FIG. 1 (an environment cancellation notification). In the description below, the fact that an environment of use is established in MFP 200 may be expressed as "a condition of use of MFP 200 being within the environment of use." The fact that an environment of use is not established in MFP 200 may be expressed as "a condition of use of MFP 200 departing from the environment of use."

FW distribution server 100 has MFP 200 which is a sender of the environment cancellation notification download standard FW as shown with a dashed arrow in FIG. 1.

The image processing system in FIG. 1 includes an MFP group 200X constituted of three MFPs 200. In the image processing system in FIG. 1, FW distribution server 100 may have each MFP 200 in MFP group 200X download standard FW, in response to transmission of the environment cancellation notification from all MFPs 200 in MFP group 200X.

(2) Appearance of MFP

Figure 2:
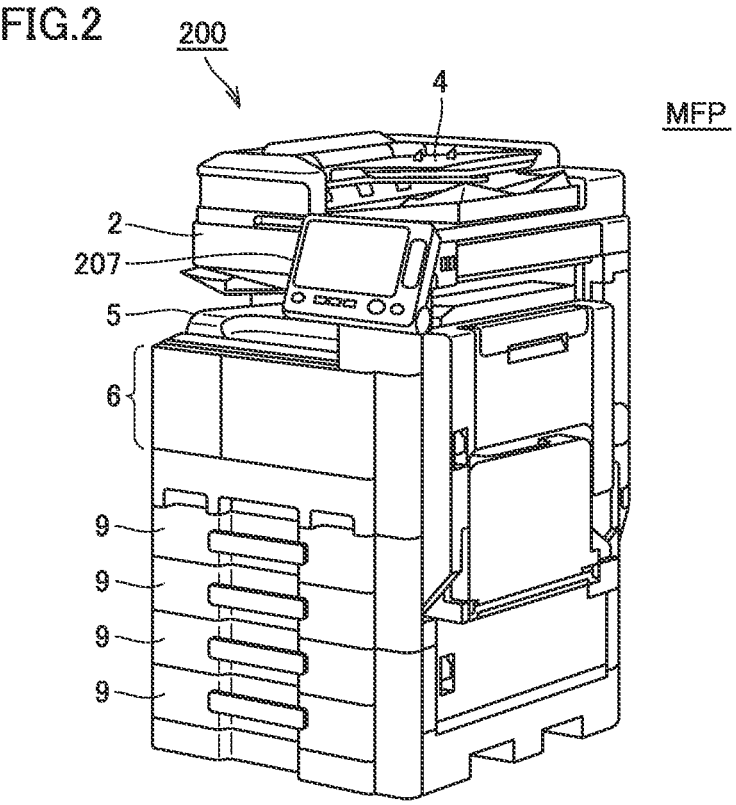
FIG. 2 is a perspective view showing an overall configuration of an MFP.

FIG. 2 is a perspective view showing an overall configuration of MFP 200.

As shown in FIG. 2, MFP 200 includes an image reading portion 2 which obtains image data by optically reading a document and an image formation portion 6 which prints an image on paper based on the image data. A feeder 4 which sends a document to image reading portion 2 is arranged in an upper surface of a main body of MFP 200 representing an image formation apparatus. A plurality of paper feed portions 9 which supply printing paper to image formation portion 6 are arranged in a lower portion of MFP 200. A tray 5 to which printing paper having an image formed by image formation portion 6 is ejected is arranged in a central portion of MFP 200. An operation panel 207 is attached on a front surface side in an upper portion of the main body of MFP 200.

(3) Hardware Configuration of MFP

Figure 3:
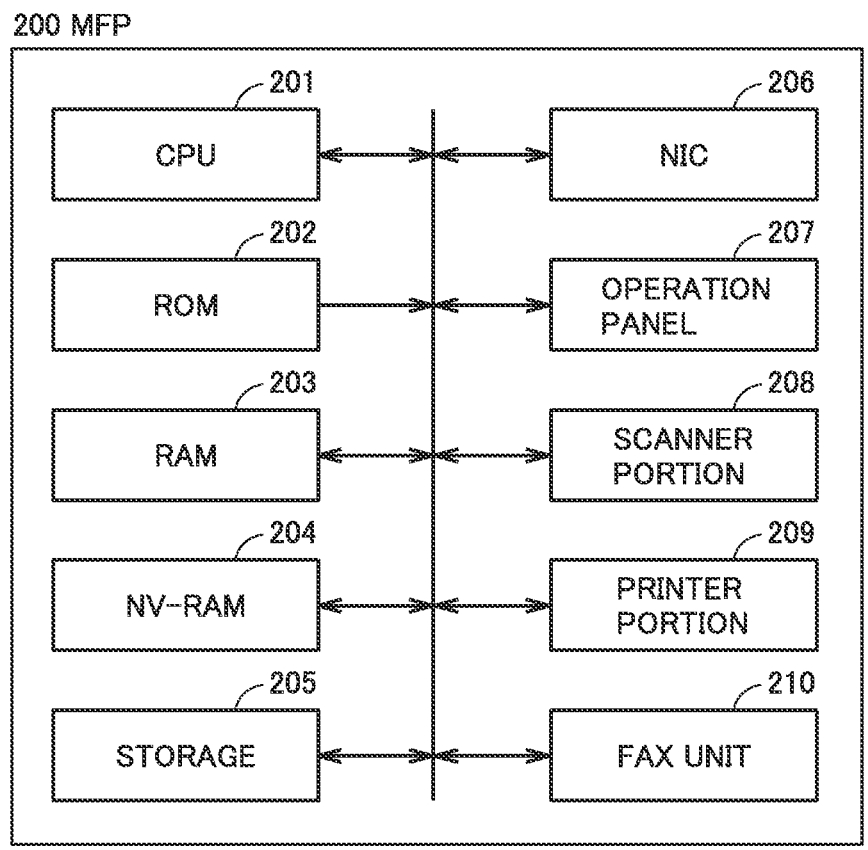
FIG. 3 is a diagram showing a hardware configuration of the MFP.

FIG. 3 is a diagram showing a hardware configuration of MFP 200. As shown in FIG. 3, MFP 200 includes, as main constituent elements, a central processing unit (CPU) 201, a read only memory (ROM) 202, a random access memory (RAM) 203, an NV-RAM 204, a storage 205, a network interface controller (NIC) 206, operation panel 207, a scanner portion 208, and a printer portion 209. Elements in MFP 200 are connected to one another through an internal bus.

CPU 201 represents one example of a processor performing processing for centralized control of operations of MFP 200.

ROM 202 stores various types of data including a program executed by CPU 201.

RAM 203 and NV-RAM 204 function as a work area while CPU 201 executes a program. RAM 203 and/or NV-RAM 204 may temporarily save image data read by scanner portion 208.

Storage 205 saves various types of data such as a destination information registered in MFP 200 or a document. Document data may be input to MFP 200 through a network or generated as scanner portion 208 reads an image.

NIC 206 is a communication interface in exchange of information by MFP 200 with FW distribution server 100.

Operation panel 207 accepts input of various types of information such as a setting value for copy quality or paper, or information for registering or selecting a transmission destination of scanning (destination registration). For example, a liquid crystal display portion on which a touch panel is layered is provided on a surface of operation panel 207. For example, operation panel 207 displays contents of setting in MFP 200.

Scanner portion 208 scans a set document and generates image data of the document. A known method can be adopted for a method of generating image data in scanner portion 208. Scanner portion 208 is included in image reading portion 2 in FIG. 2.

Printer portion 209 is an apparatus converting image data read by scanner portion 208 or print data transmitted from an external information processing apparatus such as FW distribution server 100 into data for printing, for example, in accordance with electrophotography, and printing an image of a document or the like based on resultant data. A known technique can be adopted for a manner of formation of an image such as electrophotography. Printer portion 209 is included in image formation portion 6 in FIG. 2.

In MFP 200, an operation of MFP 200 as described herein is implemented as CPU 201 executes an appropriate program. A program executed by CPU 201 may stored in storage 205 or stored in a storage medium attachable to or removable from MFP 200, instead of being stored in ROM 202 as described above. A storage medium storing the program is a medium storing data in a non-volatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (except for memory cards), an optical card, a mask ROM, an EPROM, an EEPROM (Electronically Erasable Programmable Read-Only Memory), and the like.

The program according to the present disclosure may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present invention.

The program according to the present disclosure may be provided in a manner incorporated as a part of another program. In such a case as well, the program itself does not include the module included in another program, but the program executes the processing in cooperation with another program. Such a program incorporated in another program may also be encompassed in the program according to the present invention.

The provided program product is installed in a program storing portion such as a hard disk for execution. The program product includes the program itself and a storage medium recording the program.

(4) Functional Configuration of MFP

Figure 4:
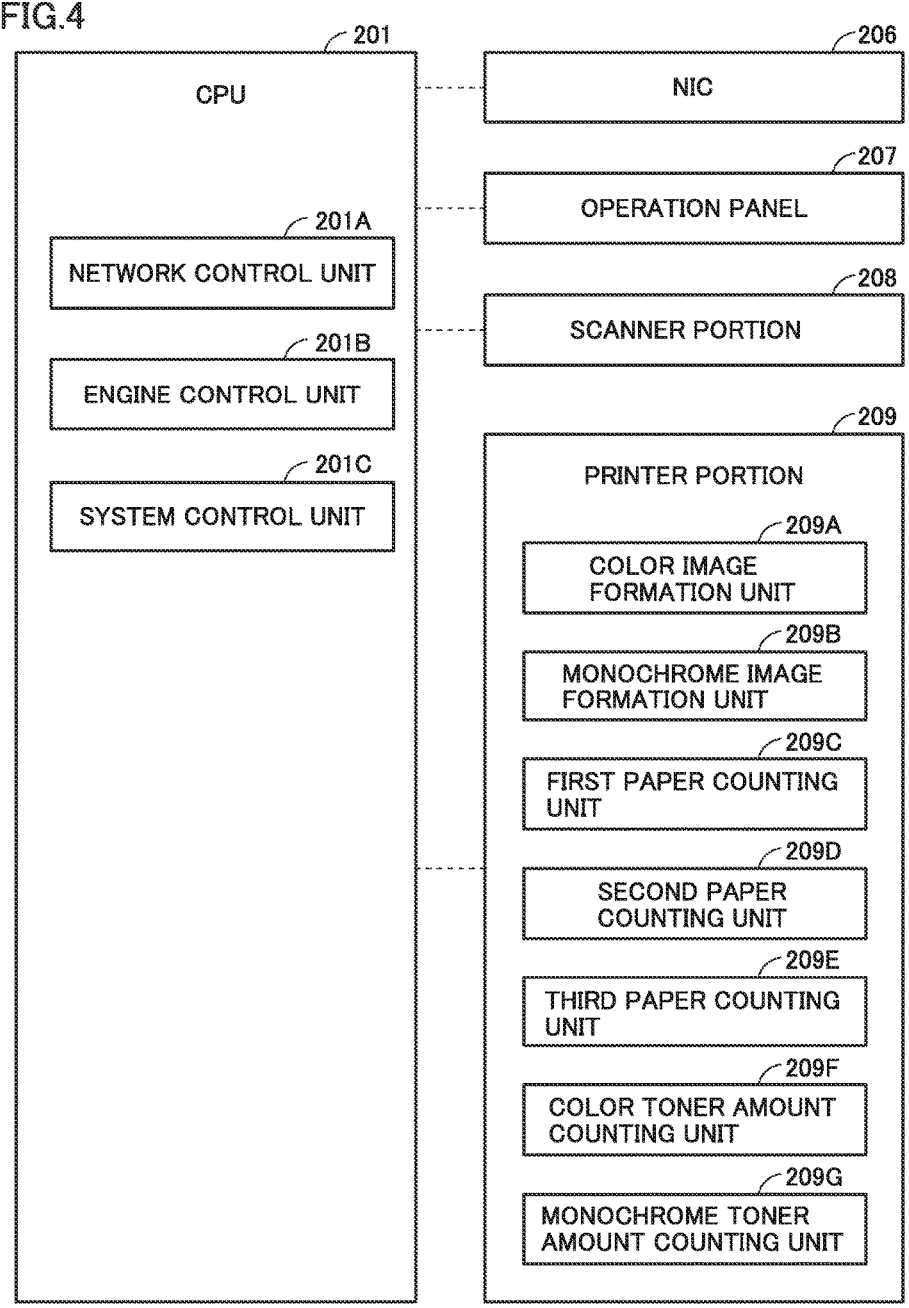
FIG. 4 is a diagram for illustrating a function implemented by the MFP.

As described above, MFP 200 implements various functions such as a printing function. FIG. 4 is a diagram for illustrating a function implemented by MFP 200.

Referring to FIG. 4, as the premise of explanation of the functions of MFP 200, a function of CPU 201 and a configuration in printer portion 209 will be described.

CPU 201 of MFP 200 functions as a network control unit 201A, an engine control unit 201B, and a system control unit 201C by executing an appropriate program. Network control unit 201A controls input and output. Engine control unit 201B controls an operation of a mechanism in an electrophotography process in printer portion 209 (a print head portion, a paper transportation portion, and a fixation portion). System control unit 201C controls a job for each function of copying, faxing, scanning, and printing.

Printer portion 209 is constituted of various elements for image formation. The elements constituting printer portion 209 include a color image formation unit 209A, a monochrome image formation unit 209B, a first paper counting unit 209C, a second paper counting unit 209D, a third paper counting unit 209E, a color toner amount counting unit 209F, and a monochrome toner amount counting unit 209G.

Color image formation unit 209A includes an element for forming a color toner image on printing paper through an electrophotography process. Color image formation unit 209A includes an element (such as a sensor) for controlling image stability of a color image in MFP 200.

Monochrome image formation unit 209B includes an element for forming a monochrome toner image on printing paper through the electrophotography process. Monochrome image formation unit 209B includes an element (such as a sensor) for controlling image stability of a monochrome image in MFP 200.

First paper counting unit 209C, second paper counting unit 209D, and third paper counting unit 209E count the number of used sheets of paper of respective three types of printing paper stored individually in paper feed portion 9 in FIG. 2. First paper counting unit 209C, second paper counting unit 209D, and third paper counting unit 209E are implemented, for example, as CPU 201 updates a count value of the type of used printing paper when a print job is executed. The count value may be reset at the time of replenishment with printing paper.

Color toner amount counting unit 209F counts an amount of consumption of toner used in image formation in color image formation unit 209A. Color toner amount counting unit 209F is implemented, for example, as CPU 201 calculates an amount of toner of each color expected to be used based on image data to be printed and holds a total of calculation results for each color when a print job is executed. An amount of consumption of toner of each color may be reset at the time of replenishment with toner of a corresponding color.

Monochrome toner amount counting unit 209G counts an amount of consumption of toner used in image formation in monochrome image formation unit 209B. Monochrome toner amount counting unit 209G is implemented, for example, as CPU 201 calculates an amount of monochrome toner expected to be used based on image data to be printed and holds a total of calculation results when a print job is executed. An amount of consumption of monochrome toner may be reset at the time of replenishment with monochrome toner.

The functions of MFP 200 are implemented mainly by system control unit 201C. More specifically, the functions of MFP 200 are implemented as CPU 201 executes firmware corresponding to each function of MFP 200. Six representative functions of MFP 200 will be listed below.

1) Copying Function

A copying function is a function to read an image on a document and form the read image on printing paper. For example, firmware for implementing the copying function includes a software module controlling scanner portion 208 and printer portion 209.

2) Fax Function

A fax function is a function to transmit and receive an image through facsimile communication. Firmware for implementing the fax function includes a software module controlling NIC 206, scanner portion 208, and printer portion 209.

3) Printer Function

A printer function is a function to form an externally input image on printing paper. Firmware for implementing the printer function includes a software module controlling NIC 206 and printer portion 209.

4) Toner Near Empty Function

A toner near empty function is a function to issue a warning that a remaining amount of toner is small. Firmware for implementing the toner near empty function includes a software module having a warning displayed on operation panel 207 when an amount of consumption of toner is equal to or greater than a prescribed amount (a remaining amount of toner is equal to or less than a prescribed amount), based on a detection output from color toner amount counting unit 209F and/or monochrome toner amount counting unit 209G.

5) Paper Near Empty Function

A paper near empty function is a function to issue a warning that a remaining amount of printing paper is small. Firmware implementing the paper near empty function includes a software module having a warning displayed on operation panel 207 when an amount of consumption of paper is equal to or greater than a prescribed amount (a remaining amount of printing paper is equal to or less than a prescribed amount), based on a detection output from first paper counting unit 209C, second paper counting unit 209D, and/or third paper counting unit 209E.

6) Image Stabilization Control Function

An image stabilization control function is a function to stabilize an image formed on MFP 200. Firmware for implementing the image stabilization control function includes a software module, for example, for having engine control unit 201B control image stabilization in color image formation unit 209A and/or monochrome image formation unit 209B. In image stabilization control, for example, color image formation unit 209A and/or monochrome image formation unit 209B form(s) a toner pattern and detect(s) a density of the toner pattern, and thereafter engine control unit 201B corrects at least one of parameters associated with development quality to a direction toward a target toner image density based on a result of detection of the density.

(5) Hardware Configuration of FW Distribution Server

Figure 5:
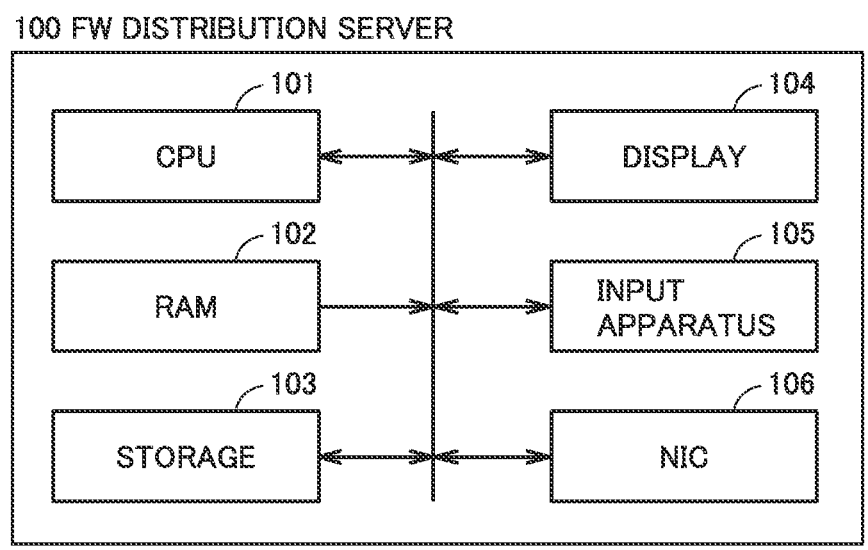
FIG. 5 is a diagram showing one example of a hardware configuration of an FW distribution server.

FIG. 5 is a diagram showing one example of a hardware configuration of FW distribution server 100.

As shown in FIG. 5, FW distribution server 100 includes, as main constituent elements, a CPU 101, a RAM 102, a storage 103, a display 104, an input apparatus 105, and an NIC 106. CPU 101, RAM 102, storage 103, display 104, input apparatus 105, and communication device 106 are connected to one another through an internal bus.

CPU 101 represents one example of an arithmetic unit performing processing for controlling an overall operation of FW distribution server 100.

RAM 102 functions as a work area while CPU 101 performs processing.

Storage 103 saves various types of data including various programs such as an OS or a browser application executed by CPU 101 and data used in execution of these programs. Storage 103 is implemented, for example, by a medium storing data in a non-volatile manner, such as a CD-ROM, a DVD-ROM, a USB memory, a memory card, an FD, a hard disk, an SSD, a magnetic tape, a cassette tape, an MO, an MD, an IC card (except for memory cards), an optical card, a mask ROM, an EPROM, an EEPROM, and the like. A program downloaded through a network may also be installed in storage 103.

Display 104 is a display apparatus for displaying an image showing a result of processing by a program executed by CPU 101. FW distribution server 100 may not have display 104.

Input apparatus 105 is implemented, for example, by a keyboard or an operation button. When input apparatus 105 accepts an input of information, it sends the information to CPU 101.

NIC 106 is a communication interface in exchange of information by FW distribution server 100 with MFP 200.

(6) Detection of Environment of Use of Customized FW

A specific example of customized FW and a method of detecting an environment for using customized FW (an environment of use) in connection with the "toner near empty function," the "paper near empty function," and the "image stabilization control function" will now be exemplified.

1) Customized FW for "Toner Near Empty Function"

The toner near empty function is a function to show a warning when an amount of consumption of toner is equal to or greater than a prescribed amount (a remaining amount of toner is equal to or less than a prescribed amount) as described above. For standard FW, a "prescribed amount" associated with representation of a warning is specified.

One example of customized FW for the toner near empty function specifies as the "prescribed amount," an amount smaller than an amount specified for standard FW. With installation of customized FW, a warning about toner near empty can be shown at an earlier stage during the course of consumption of toner, than with installation of standard FW.

2) Environment of Use of Customized FW for "Toner Near Empty Function"

Figure 6:
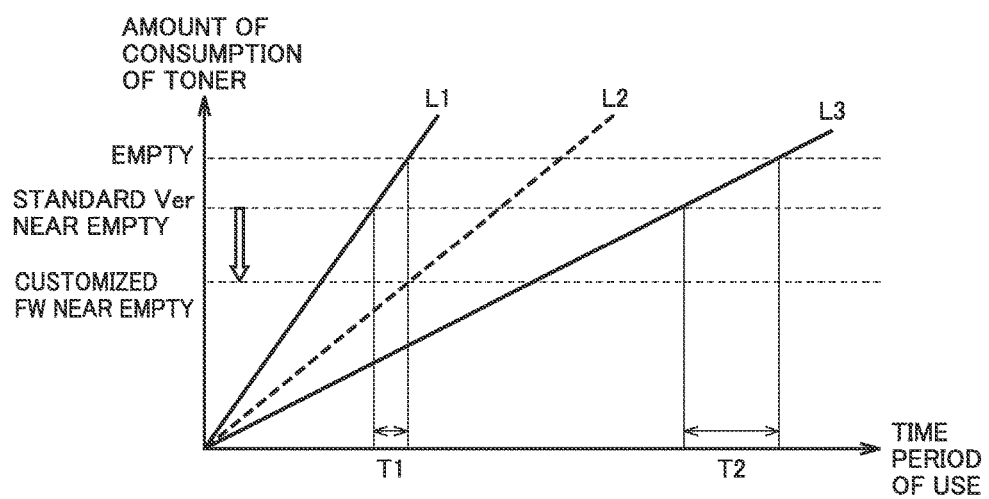
FIG. 6 is a diagram for illustrating an environment of use of customized FW for a "toner near empty function."

In MFP 200, a situation that a rate of consumption of toner is equal to or higher than a certain rate is an environment of use of customized FW. FIG. 6 is a diagram for illustrating an environment of use of customized FW for the "toner near empty function." In FIG. 6, the ordinate represents an amount of consumption of toner and the abscissa represents lapse of time during which MFP 200 is used. FIG. 6 shows three lines L1 to L3. An amount of consumption of toner here represents, for example, an amount of consumption of monochrome toner.

Line L2 represents a "certain rate" in connection with a rate of consumption of toner.

Line L1 is greater in inclination than line L2. Namely, a situation shown with line L1 is higher in rate of consumption of toner than a situation shown with line L2. Therefore, the situation shown with line L1 is a situation where an environment of use of customized FW for the "toner near empty function" has been established.

Line L3 is smaller in inclination than line L2. Namely, a situation shown with line L3 is lower in rate of consumption of toner than the situation shown with line L2. Therefore, the situation shown with line L3 is a situation where an environment of use of customized FW for the "toner near empty function" has not been established.

FIG. 6 shows a threshold value at which a warning about toner near empty is output in the case of standard FW as "standard Ver near empty." A threshold value at which a warning about toner near empty is output in the case of customized FW is shown as "customized FW near empty."

Customized FW for the toner near empty function is installed, for example, in MFP 200 which is assumed to be used in a situation in which a frequency of use of color toner and/or monochrome toner is high.

In MFP 200, an amount of consumption is detected for each color of color toner (CYM) and a warning about toner near empty may be shown.

3) Customized FW for "Paper Near Empty Function"

The paper near empty function is a function to show a warning when an amount of consumption of printing paper is equal to or greater than a certain amount as described above. For standard FW, a "certain amount" in connection with representation of a warning is specified.

One example of customized FW for the paper near empty function specifies as the "prescribed amount," an amount smaller than an amount specified for standard FW. With installation of customized FW, a warning about paper near empty can be shown at an earlier stage during the course of consumption of printing paper, than with installation of standard FW.

4) Environment of Use of Customized FW for "Paper Near Empty Function"

Figure 7:
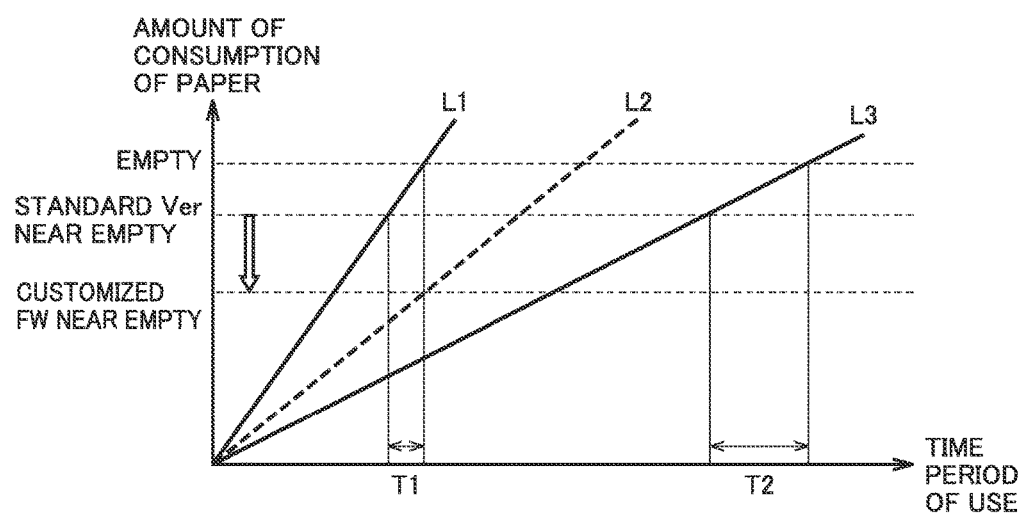
FIG. 7 is a diagram for illustrating an environment of use of customized FW for a "paper near empty function."

In MFP 200, a situation that a rate of consumption of printing paper is equal to or higher than a certain rate is an environment of use of customized FW. FIG. 7 is a diagram for illustrating an environment of use of customized FW for the "paper near empty function." In FIG. 7, the ordinate represents an amount of consumption of printing paper and the abscissa represents lapse of time during which MFP 200 is used. FIG. 7 shows three lines L1 to L3. An amount of consumption of printing paper here represents, for example, an amount of consumption detected by any of first paper counting unit 209C to third paper counting unit 209E.

Line L2 represents a "certain rate" in connection with a rate of consumption of printing paper.

Line L1 is greater in inclination than line L2. Namely, a situation shown with line L1 is higher in rate of consumption of printing paper than a situation shown with line L2. Therefore, the situation shown with line L1 is a situation where an environment of use of customized FW for the "paper near empty function" has been established.

Line L3 is smaller in inclination than line L2. Namely, a situation shown with line L3 is lower in rate of consumption of printing paper than the situation shown with line L2. Therefore, the situation shown with line L3 is a situation where an environment of use of customized FW for the "paper near empty function" has not been established.

FIG. 7 shows a threshold value at which a warning about paper near empty is output in the case of standard FW as "standard Ver near empty." A threshold value at which a warning about paper near empty is output in the case of customized FW is shown as "customized FW near empty."

Customized FW for the paper near empty function is installed, for example, in MFP 200 which is assumed to be used in a situation in which a frequency of use of printing paper is high.

MFP 200 counts an amount of consumption of three types of printing paper, as shown with first paper counting unit 209C, second paper counting unit 209D, and third paper counting unit 209E in FIG. 4. As compared with the standard FW, only for some of the three types of printing paper, customized FW for the "paper near empty function" may have a threshold value modified, at which a warning about near empty is shown.

In particular, in MFP 200, paper feed portion 9 may include a storage portion dedicated for printing paper used for the fax function. First paper counting unit 209C may detect an amount of consumption of paper stored in the storage portion dedicated for printing paper used for the fax function. As compared with the standard FW, for an amount of use (or a remaining amount) of printing paper dedicated for the fax function, customized FW for the "paper near empty function" may have a threshold value modified, at which a warning about near empty is shown.

5) Customized FW for "Image Stabilization Control Function"

The image stabilization control function is a function to perform processing for stabilizing a formed image in both of color image formation unit 209A and monochrome image formation unit 209B.

In one example of customized FW for the image stabilization control function, as compared with standard FW, a frequency of processing for stabilization of an image in monochrome image formation unit 209B is set to be higher than a frequency of processing for stabilization of an image in color image formation unit 209A. Namely, customized FW is lower in frequency of processing for stabilization of an image in color image formation unit 209A (the number of times of processing performed in a unit period) than standard FW.

6) Environment of Use of Customized FW for "Image Stabilization Control Function"

In MFP 200, an environment in which a frequency of output (formation on printing paper) of a monochrome image is higher by a certain value or more than a frequency of output of a color image is an environment of use of customized FW.

In MFP 200, for example, the number of output monochrome images and the number of output color images are counted with a known method. In MFP 200, a frequency of output of monochrome images is specified by specifying the number of output monochrome images per unit period (for example, one week). In MFP 200, a frequency of output of color images is specified by specifying the number of output color images per unit period. Thereafter, these two frequencies are compared with each other. When the frequency of output of monochrome images is higher than the frequency of output of color images by a certain value or more, it is determined that an environment of use of customized FW for the "image stabilization control function" has been established. When an environment in which the frequency of output of monochrome images is higher than the frequency of output of color images by a certain value or more is not established, it is determined that an environment of use of customized FW for the "image stabilization control function" has not been established.

Customized FW for the image stabilization control function is installed, for example, in MFP 200 assumed to be used in a situation where output mainly of a monochrome image is indicated. In general, a time period required for processing for stabilization of an image in color image formation unit 209A is longer than a time period required for processing for stabilization of an image in monochrome image formation unit 209B. With installation of customized FW, in MFP 200 placed in an environment where a frequency of output of color images is relatively low, the number of times of processing performed for stabilization of color images can be decreased and thus a waiting time of a user, for stabilization of a color image can be decreased.

(7) Flow of Processing in MFP

Figure 8:
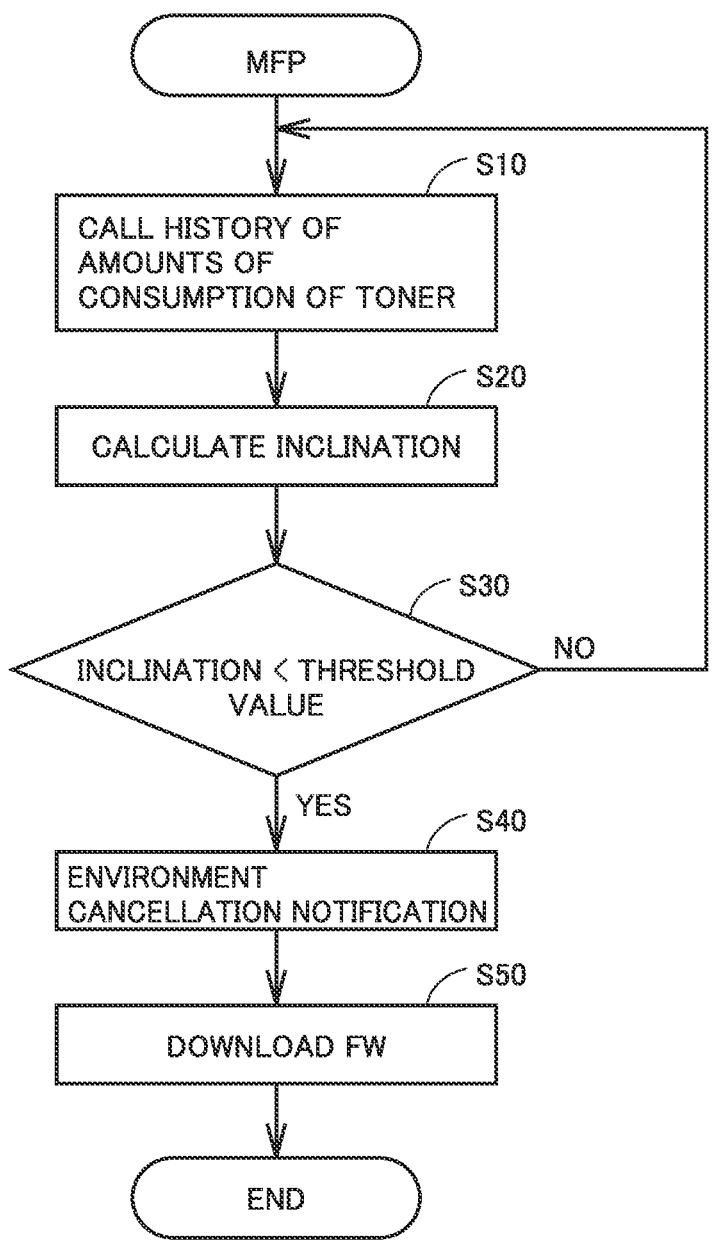
FIG. 8 is a flowchart of processing for downloading standard FW performed in the MFP in which customized FW has been installed.

FIG. 8 is a flowchart of processing for downloading standard FW performed in MFP 200 in which customized FW has been installed. Processing shown in FIG. 8 is performed, for example, every certain period (for example, one week). The processing shown in FIG. 8 is processing performed in MFP 200 in which customized FW for the "toner near empty function" has been installed by way of example of customized FW.

Referring to FIG. 8, when timing to perform the processing in FIG. 8 comes, in step S10, CPU 201 calls a history of amounts of consumption of toner for a certain period. Here, monochrome toner is addressed by way of example of toner. Thereafter, control proceeds to step S20.

In step S20, CPU 201 calculates an inclination of an amount of consumption of toner based on the amounts of consumption of toner for a certain period called in step S10. Thereafter, control proceeds to step S30.

In step S30, CPU 201 determines whether or not the inclination calculated in step S20 is smaller than a threshold value (for example, the inclination of line L2 in FIG. 6). When CPU 201 determines that the calculated inclination is smaller than the threshold value (YES in step S30), control proceeds to step S40. When CPU 201 determines that the calculated inclination is not smaller than the threshold value (NO in step S30), control returns to step S10. When control returns to step S10, the processing in FIG. 8 is not performed until the certain period further elapses.

In step S40, CPU 201 notifies FW distribution server 100 of cancellation of the environment of use of customized FW in MFP 200 on which CPU 201 is mounted. In response to the notification, FW distribution server 100 transmits the latest standard FW to MFP 200. Thereafter, control proceeds to step S50.

In step S50, CPU 201 downloads standard FW, that is, receives the latest standard FW transmitted from FW distribution server 100, and updates firmware by installing the downloaded latest standard FW. The processing in FIG. 8 thus ends.

According to the processing in FIG. 8, when an environment of use of customized FW has not been established in MFP 200, MFP 200 in which customized FW has been installed notifies FW distribution server 100 of that fact. In the present embodiment, FW distribution server 100 transmits the latest standard FW to MFP 200 in response to the notification. MFP 200 downloads standard FW and thereafter automatically updates firmware.

(8) Flow of Processing in Image Processing System

Figure 9:
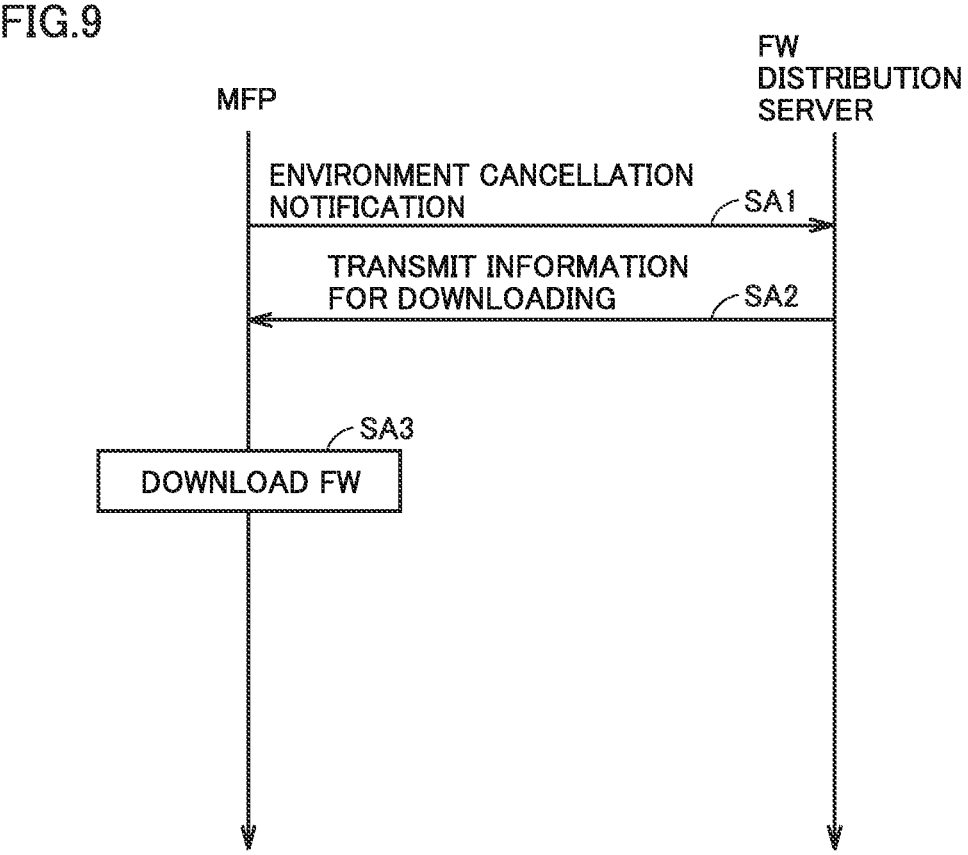
FIG. 9 is a diagram showing a sequence when the MFP in which the customized FW has been installed downloads standard FW in the first embodiment of the image processing system.

A flow of processing in the image processing system as a whole in the first embodiment will be described with reference to FIG. 9. FIG. 9 is a diagram showing a sequence at the time when MFP 200 in which the customized FW has been installed downloads standard FW in the first embodiment of the image processing system. The sequence diagram shows exchange between MFP 200 and FW distribution server 100.

More specifically, in the image processing system in the first embodiment, as shown with step SA1 in FIG. 9, when MFP 200 determines that an environment of use has not been established in MFP 200, it transmits an "environment cancellation notification" to FW distribution server 100, which corresponds to step S40 in FIG. 8.

When FW distribution server 100 receives the "environment cancellation notification" from MFP 200, as shown with step SA2, FW distribution server 100 transmits standard FW to MFP 200. In response, in step SA3, MFP 200 receives the standard FW and updates firmware. Step SA3 corresponds to step S50 in FIG. 8, and firmware is updated by installing downloaded standard FW.

Second Embodiment

In the image processing system in a second embodiment, for example, three MFPs 200 are managed in a group like MFP group 200X in FIG. 1. When an environment of use of customized FW has not been established, each MFP 200 gives a notification of that fact as an "environment cancellation notification" (see step S40 in FIG. 8) as in the first embodiment.

In the second embodiment, in response to reception of the "environment cancellation notification" from all MFPs 200 forming MFP group 200X, FW distribution server 100 transmits "information for downloading" to each MFP 200.

Figure 10:
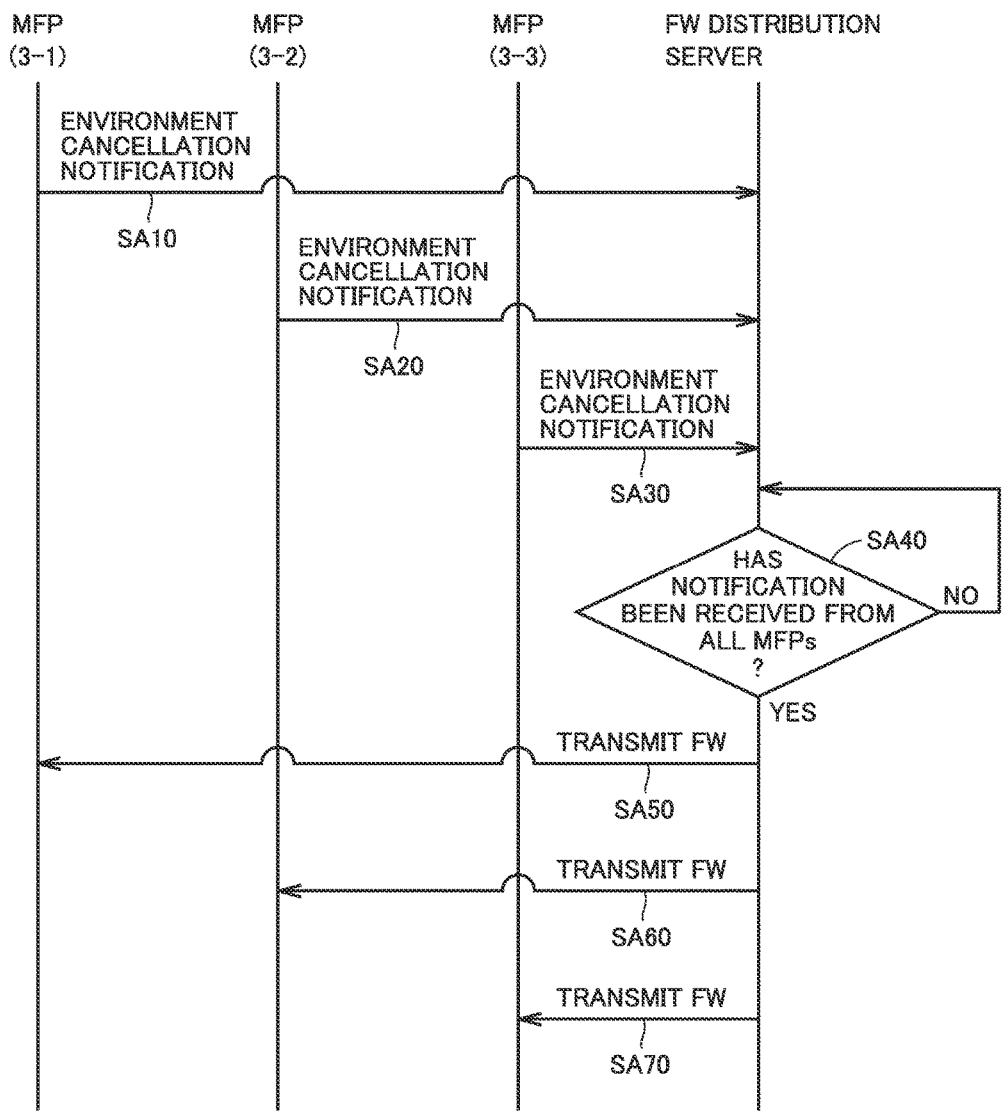
FIG. 10 is a diagram showing a sequence when the MFP in which the customized FW has been installed downloads the standard FW in a second embodiment of the image processing system.

FIG. 10 is a diagram showing a sequence at the time when MFP 200 in which the customized FW has been installed downloads the standard FW in the second embodiment of the image processing system. A sequence in processing performed in the image processing system in the second embodiment will more specifically be described with reference to FIG. 10.

As shown with steps SA10, SA20, and SA30 in FIG. 10, each of three MFPs 200 forming MFP group 200X transmits an environment cancellation notification to FW distribution server 100.

CPU 101 of FW distribution server 100 determines whether or not the environment cancellation notification has been received from all MFPs 200 forming MFP group 200X as shown with step SA40. CPU 101 specifies from which MFP 200 the "environment cancellation notification" has been received, by referring to information specifying each MFP 200 registered in storage 103. CPU 101 has control remain in step SA40 until the environment cancellation notification is received from all MFPs 200 (NO in step SA40), and when it determines that the environment cancellation notification has been received from all MFPs 200, control proceeds to step SA50 and later.

CPU 101 has standard FW transmitted to each MFP 200 in steps SA50, SA60, and SA70.

Standard FW may be transmitted from FW distribution server 100 to each MFP 200 on condition that an instruction for transmission of firmware is transmitted from each MFP 200.

FW distribution server 100 may manage MFP 200 for each of two or more groups. Namely, when CPU 101 receives an environment cancellation notification from all MFPs 200 belonging to each group of two or more groups, it may allow downloading of standard FW to all MFPs 200 belonging to the group.

Third Embodiment

The image processing system in a third embodiment further includes a server managing MFP 200 in addition to the constituent elements in the image processing system in the first embodiment.

(1) Configuration of Image Processing System

Figure 11:
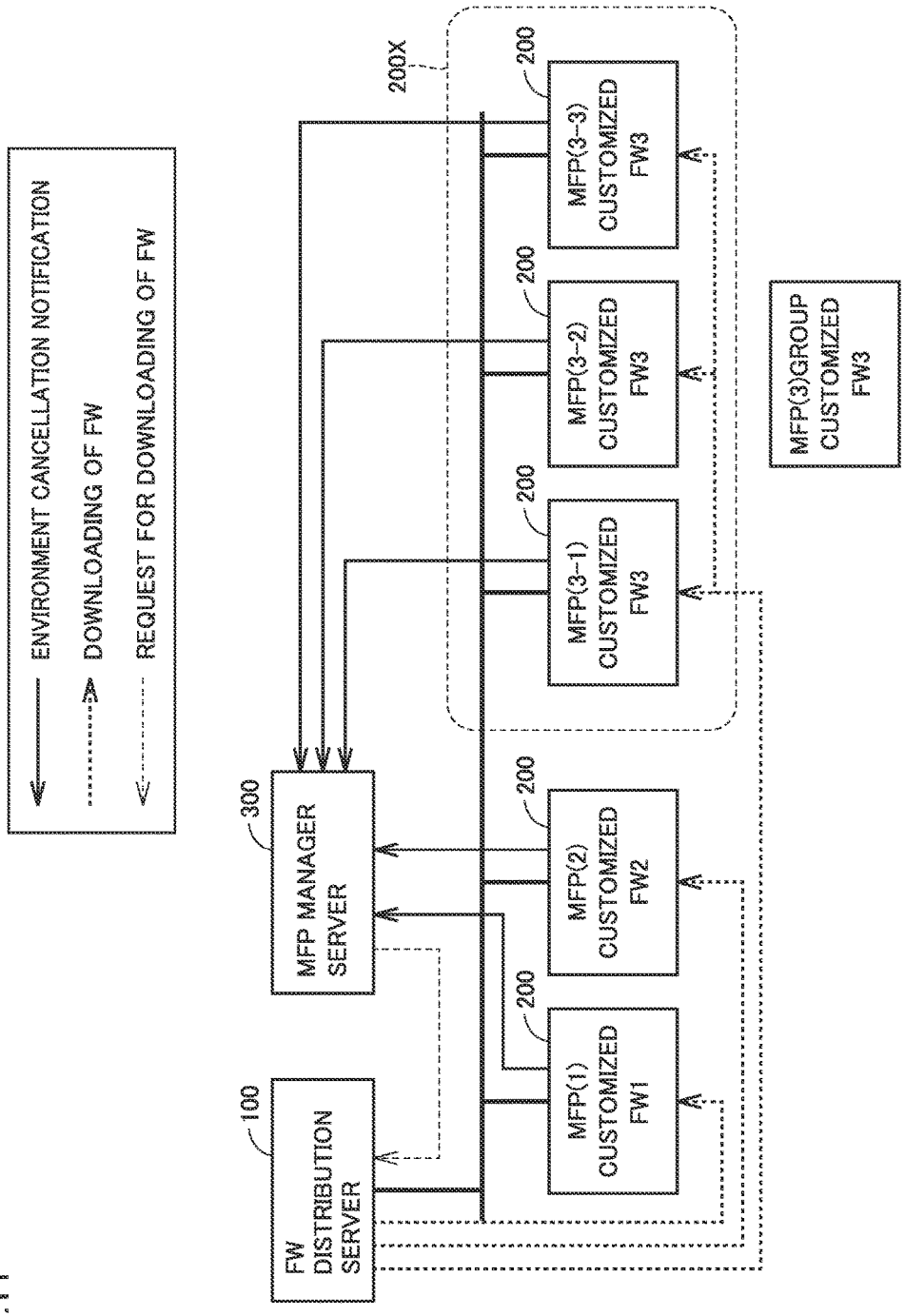
FIG. 11 is a diagram showing a configuration of the image processing system in a third embodiment.

FIG. 11 is a diagram showing a configuration of the image processing system in the third embodiment. FIG. 11 shows an MFP manager server 300 as a server managing MFP 200.

In the third embodiment, as shown with a solid arrow, each of five MFPs 200 transmits an environment cancellation notification to MFP manager server 300. In response, as shown with a thin dashed line, MFP manager server 300 requests of FW distribution server 100 for downloading of standard FW to each MFP 200. In response, as shown with a thick dashed arrow, standard FW is downloaded from FW distribution server 100 to MFP 200.

(2) Hardware Configuration of MFP Manager Server 300

Figure 12:
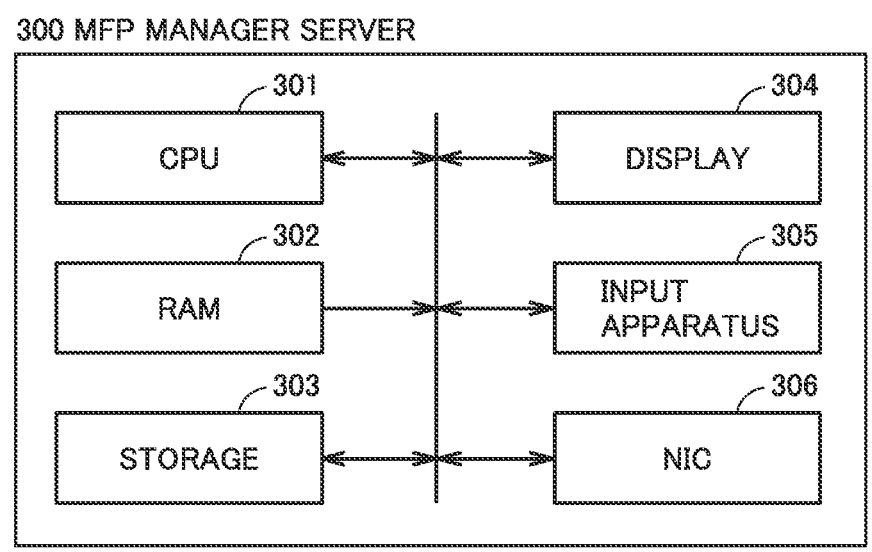
FIG. 12 is a diagram showing one example of a hardware configuration of an MFP manager server.

FIG. 12 is a diagram showing one example of a hardware configuration of MFP manager server 300.

As shown in FIG. 12, MFP manager server 300 includes, as main constituent elements, a CPU 301, a RAM 302, a storage 303, a display 304, an input apparatus 305, and an NIC 306. CPU 301, RAM 302, storage 303, display 304, input apparatus 305, and communication device 306 are connected to one another through an internal bus.

CPU 301 represents one example of an arithmetic unit performing processing for controlling an overall operation of MFP manager server 300.

RAM 302 functions as a work area while CPU 301 performs processing.

Storage 303 saves various types of data including various programs such as an OS or a browser application executed by CPU 301 and data used in execution of these programs. Storage 303 is implemented, for example, by a medium storing data in a non-volatile manner, such as a CD-ROM, a DVD-ROM, a USB memory, a memory card, an FD, a hard disk, an SSD, a magnetic tape, a cassette tape, an MO, an MD, an IC card (except for memory cards), an optical card, a mask ROM, an EPROM, an EEPROM, and the like. A program downloaded through a network may also be installed in storage 303.

Display 304 is a display apparatus for displaying an image showing a result of processing by a program executed by CPU 301. MFP manager server 300 may not have display 304.

Input apparatus 305 is implemented, for example, by a keyboard or an operation button. When input apparatus 305 accepts input of information, it sends the information to CPU 301.

NIC 306 is a communication interface in exchange of information by MFP manager server 300 with FW distribution server 100 or MFP 200.

Figure 13:
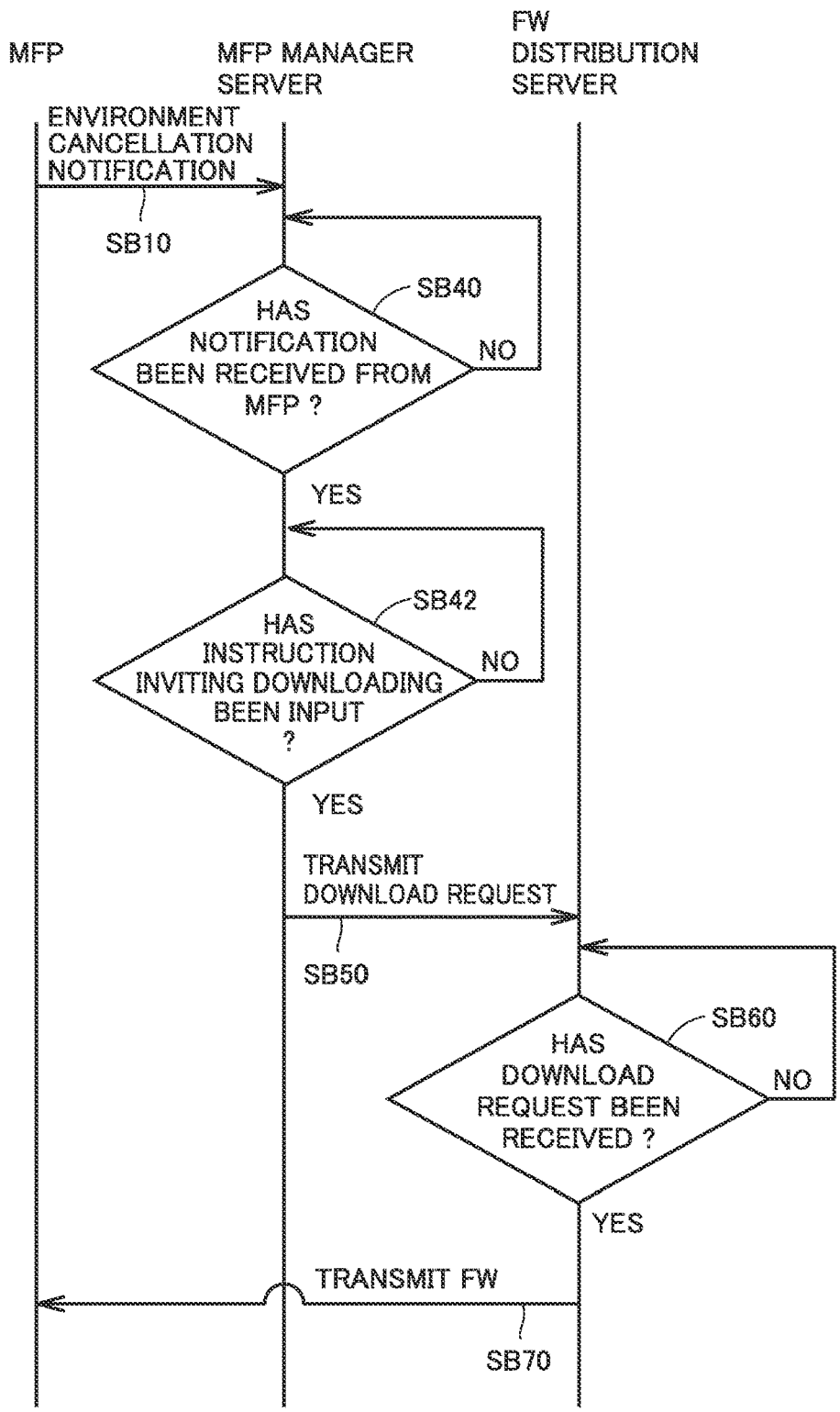
FIG. 13 is a diagram showing a sequence in processing in the image processing system in the third embodiment.

FIG. 13 is a diagram showing a sequence in processing in the image processing system in the third embodiment. In the image processing system, initially, referring to FIG. 13, as shown with step SB10, MFP 200 transmits an environment cancellation notification to MFP manager server 300.

In step SB40, CPU 301 of MFP manager server 300 determines whether or not it has received the environment cancellation notification from MFP 200. CPU 301 has control remain in step SB40 until it determines that the environment cancellation notification has been received from MFP 200 (NO in step SB40), and when it thereafter determines that the environment cancellation notification has been received from MFP 200 (YES in step SB40), control proceeds to step SB42.

In step SB42, CPU 301 stands by until an input from a manager of the image processing system for an instruction to invite downloading of standard FW is received (NO in step SB42). When the instruction is input (YES in step SB42), control proceeds to step SB50. The instruction invites downloading of standard FW to MFP 200 from which the environment cancellation notification has been received in step SB40. Whether or not the input is from the manager of the image processing system is determined, for example, based on whether or not an ID and a password for the manager have been input to MFP manager server 300.

In step SB50, CPU 301 requests of FW distribution server 100 for downloading of standard FW to all MFPs 200 forming MFP group 200X.

CPU 101 of FW distribution server 100 stands by until it receives a download request from MFP manager server 300 in step SB60 (NO in step SB60). Thereafter, when CPU 101 determines that it has received a download request from MFP manager server 300 (YES in step SB60), control proceeds to step SB70 and later.

In step SB70, CPU 101 has standard FW transmitted to each MFP 200. In response to transmission, each MFP 200 downloads standard FW and thereafter the downloaded standard FW is installed in MFP 200. Standard FW may be transmitted from FW distribution server 100 to MFP 200 on condition that an instruction for transmission of firmware is transmitted from MFP 200.

In the third embodiment described above, MFP 200 in which customized FW has been installed transmits an environment cancellation notification to MFP manager server 300. In response, MFP manager server 300 allows MFP 200 to download standard FW from FW distribution server 100.

Fourth Embodiment

In the image processing system in a fourth embodiment, as in the image processing system (see FIG. 11) in the third embodiment, MFP manager server 300 manages MFP 200. In the image processing system in the fourth embodiment, MFP manager server 300 manages a plurality of MFPs 200 as a group as shown with MFP group 200X in FIG. 11. More specifically, MFP manager server 300 requests of FW distribution server 100 for downloading of standard FW to all MFPs 200 forming MFP group 200X on condition that an environment cancellation notification has been received from all MFPs 200 forming MFP group 200X.

FIG. 14 is a diagram showing a sequence in processing in the image processing system in a fourth embodiment. Referring to FIG. 14, in the image processing system in the fourth embodiment, as shown with steps SB10, SB20, and SB30, each of three MFPs 200 forming MFP group 200X transmits an environment cancellation notification to MFP manager server 300.

CPU 301 of MFP manager server 300 determines in step SB41 whether or not it has received the environment cancellation notification from all MFPs 200 forming MFP group 200X. CPU 301 has control remain in step SB41 until it determines that the environment cancellation notification has been received from all MFPs 200 forming MFP group 200X (NO in step SB41), and when it thereafter determines that the environment cancellation notification has been received from all MFPs 200 (YES in step SB41), control proceeds to step SB42.

In step SB42, CPU 301 stands by until an input from a manager of the image processing system for an instruction to invite downloading of standard FW in each MFP 200 is received (NO in step SB42). When the instruction is input (YES in step SB42), control proceeds to step SB50. Whether or not the input is from the manager of the image processing system is determined, for example, based on whether or not an ID and a password for the manager have been input to MFP manager server 300.

In step SB50, CPU 301 requests of FW distribution server 100 for downloading of standard FW to all MFPs 200 forming MFP group 200X.

CPU 101 of FW distribution server 100 stands by until it receives a download request from MFP manager server 300 in step SB60 (NO in step SB60). When CPU 101 determines that it has received a download request from MFP manager server 300 (YES in step SB60), control proceeds to step SB70 and later.

CPU 101 has standard FW transmitted to each MFP 200 in steps SB70, SB80, and SB90. In response, each MFP 200 downloads standard FW and thereafter downloaded standard FW is installed in MFP 200.

Standard FW may be transmitted from FW distribution server 100 to each MFP 200 on condition that an instruction for transmission of firmware is transmitted from each MFP 200.

MFP management server 100 may manage MFP 200 for each of two or more groups. Namely, when CPU 301 receives an environment cancellation notification from all MFPs 200 belonging to each group of two or more groups, it may request of FW distribution server 100 for downloading of standard FW to all MFPs 200 belonging to the group.

Fifth Embodiment

The image processing system in a fifth embodiment includes FW distribution server 100, MFP 200, and MFP manager server 300 as in the image processing system in the fourth embodiment. In the fifth embodiment, FW distribution server 100 instructs MFP 200 to download standard FW.

FIG. 15 is a diagram showing a sequence in processing performed in the image processing system in the fifth embodiment.

As shown in FIG. 15, when it is determined in step SB41 that an environment cancellation notification has been received from all MFPs 200 forming MFP group 200X (YES in step SB41), CPU 301 of MFP manager server 300 allows control to proceed to step SB42.

In step SB42, CPU 301 stands by until an input from a manager of the image processing system for an instruction to invite downloading of standard FW in each MFP 200 is received (NO in step SB42). When the instruction is input (YES in step SB42), control proceeds to step SB44 and later.

CPU 301 indicates downloading of standard FW to MFPs 200 forming MFP group 200X in steps SB44, SB46, and SB48.

In response, each MFP 200 requests of FW distribution server 100 for downloading of standard FW in steps SB70A, SB80A, and SB90A.

In response, CPU 101 has standard FW transmitted to each MFP 200 in steps SB70, SB80, and SB90.

In the fifth embodiment described above, MFP 200 notifies MFP manager server 300 of the fact that an environment of use of customized FW is no longer established in MFP 200. In response, MFP manager server 300 instructs each MFP 200 to download standard FW. In response to the instruction, each MFP 200 downloads standard FW from FW distribution server 100.

MFP manager server 300 may manage a plurality of groups of MFPs 200 for each group in the fifth embodiment. Namely, CPU 301 may instruct, for each group, all MFPs 200 forming the group to download standard FW on condition that an environment cancellation notification has been received from all MFPs 200 forming the group.

MFP manager server 300 does not have to manage MFPs 200 in a group in the fifth embodiment. Namely, CPU 301 may instruct MFP 200 to download standard FW each time it receives an environment cancellation notification from MFP 200.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An image processing apparatus in which firmware customized for a user who uses the image processing apparatus has been installed in advance, said image processing apparatus comprising:
   a hardware processor; and
   a network interface controller (NIC), wherein
   said hardware processor is configured to:
   monitor a condition of use of the image processing apparatus;
   determine whether the monitored condition of use is a condition of use associated with the customized firmware customized to an environment of use of the image processing apparatus;
   in response to determining that the monitored condition of use departs from the condition of use associated with the customized firmware, instruct the NIC to notify a firmware distribution server to cancel the environment of use of the customized firmware,
indicating the monitored condition of use of the image processing apparatus;
   download, from the firmware distribution server, a latest standard firmware common to all image processing apparatuses; and
   update the customized firmware to the latest standard firmware in the image processing apparatus.

2. The image processing apparatus according to claim 1, further comprising:
   an image formation unit for forming an image on a recording medium, wherein the hardware processor is further configured to detect an amount of consumption of a consumer item consumed by the image formation unit and to issue a warning when the detected amount of consumption is out of a prescribed range, and an amount of consumption of the consumer item under a condition of issuance of the warning by the customized firmware is smaller than an amount of consumption of the consumer item under a condition of issuance of the warning by a standard firmware of the customized firmware.

3. The image processing apparatus according to claim 2, wherein
   the amount of consumption is an amount of consumption of toner in a toner cartridge used by the image formation unit,
   the warning is issued when the detected amount of consumption is equal to or greater than a prescribed amount, and
   the customized firmware has the warning issued, with an amount of consumption of toner being smaller than an amount of consumption of toner associated with the standard firmware.

4. The image processing apparatus according to claim 2, wherein
   the amount of consumption is an amount of consumption of a recording medium stored in a storing portion storing the recording medium,
   the warning is issued when the detected amount of consumption is equal to or greater than a prescribed amount, and
   the customized firmware has the warning issued, with an amount of consumption of the recording medium being smaller than an amount of consumption of the recording medium associated with the standard firmware.

5. The image processing apparatus according to claim 4, wherein
   the storing portion stores two or more types of recording media,
   the hardware processor detects an amount of consumption of each of the two or more types of recording media,
   the warning is issued when the amount of consumption of each of the two or more types of recording media is equal to or greater than an amount set in advance for each amount of consumption, and
   the customized firmware has the warning issued for some recording media of the two or more types of recording media, with an amount of consumption of the recording medium being smaller than an amount of consumption of the recording medium associated with the standard firmware.

6. The image processing apparatus according to claim 5, having a facsimile communication function, wherein
   the some recording media include a recording medium used for recording of information received for the facsimile communication function.

7. The image processing apparatus according to claim 1, comprising an image formation unit for forming an image on a recording medium, wherein the hardware processor is further configured to perform stabilization processing in formation of an image by the image formation unit, and a frequency of the stabilization processing by the customized firmware is different from a frequency of the stabilization processing by a standard firmware of the customized firmware.

8. The image processing apparatus according to claim 7, further comprising:
   a storing portion for storing two or more types of recording media;
   a color image formation unit for forming a color image; and
   a monochrome image formation unit for forming a monochrome image, wherein
   the frequency of the stabilization processing by the customized firmware is higher than the frequency of the stabilization processing in the color image formation unit by the standard firmware.

9. The image processing apparatus according to claim 1, comprising a plurality of hardware modules for image processing, wherein the customized firmware and the latest standard firmware are software for implementing one function by using the plurality of hardware modules.

10. The image processing apparatus according to claim 1, wherein the hardware processor is configured to notify a management server managing the image processing apparatus of the result of the determination.

11. The image processing apparatus according to claim 1, wherein the hardware processor is further configured to request the firmware distribution server for the downloading of the latest standard firmware.

12. A distribution server for updating a customized firmware installed in an image processing apparatus, said distribution server comprising:
  a hardware processor; and
  a network interface controller (NIC), wherein the hardware processor is configured to:
    receive an environment cancellation notification from the image processing apparatus, indicating a condition of use of the image processing apparatus which monitors the condition of use of the image processing apparatus, determines whether the monitored condition of use is a condition of use associated with the customized firmware customized to an environment of use of the image processing apparatus, and in response to determining that the monitored condition of use departs from the condition of use associated with the customized firmware, notifies the distribution server to cancel the environment of use of the customized firmware;
  in response to receiving the environment cancellation notification, transmit, via the NIC, to the image processing apparatus, a latest standard firmware common to all image processing apparatuses for updating the image processing apparatus, wherein the image processing apparatus updates the customized firmware to the latest standard firmware in the image processing apparatus.

13. The distribution server according to claim 12, wherein the hardware processor is configured to transmit, when it is determined that a plurality of image processing apparatuses registered in advance depart from the condition of use, the latest standard firmware to the plurality of the image processing apparatuses.

14. The distribution server according to claim 13, wherein the image processing apparatus has an image formation unit for forming an image on a recording medium, the hardware processor of the image processing apparatus is configured to detect an amount of consumption of a consumer item consumed by the image formation unit and to have the image processing apparatus issue a warning when the detected amount of consumption is out of a prescribed range, and an amount of consumption of the consumer item under a condition of issuance of the warning by the customized firmware is smaller than an amount of consumption of the consumer item under a condition of issuance of the warning by a standard firmware of the customized firmware.

15. The distribution server according to claim 13, wherein the image processing apparatus has an image formation unit for forming an image on a recording medium, and a frequency of stabilization processing by the customized firmware is different from a frequency of the stabilization processing by a standard firmware of the customized firmware.

16. A management server for managing a plurality image processing apparatuses in which a customized firmware has been installed, said management server comprising:
  a hardware processor configured to:
  receive an environment cancellation notification from the plurality of image processing apparatuses, which monitor conditions of use of the plurality of image processing apparatuses, determine whether the monitored conditions of use are conditions of use associated with the customized firmware customized to an environment of use of the image processing apparatuses, and in response to determining that the monitored conditions of use depart from the conditions of use associated with the customized firmware, and notify the management server to cancel the environment of use of the customized firmware, indicating the monitored conditions of use of the image processing apparatuses; and
  in response to receiving the environment cancellation notification, transmit, to the image processing apparatuses, a latest standard firmware common to the image processing apparatuses for updating the image processing apparatuses, wherein the image processing apparatuses update the customized firmware to the latest standard firmware in the image processing apparatuses.

17. The management server according to claim 16, wherein
  the hardware processor is further configured to instruct the plurality of image processing apparatuses to download, when it is determined that a plurality of image processing apparatuses registered in advance depart from the condition of use, the latest standard firmware from the firmware distribution server.

18. The management server according to claim 16, wherein each image processing apparatus has an image formation unit for forming an image on a recording medium, a hardware processor, of each image processing apparatus, is configured to detect an amount of consumption of a consumer item consumed by the image formation unit and to have each image processing apparatus issue a warning when the detected amount of consumption is out of a prescribed range, and an amount of consumption of the consumer item under a condition of issuance of the warning by the customized firmware is smaller than an amount of consumption of the consumer item under a condition of issuance of the warning by a standard firmware of the customized firmware.

19. The management server according to claim 16, wherein each image processing apparatus has an image formation unit for forming an image on a recording medium, and a frequency of stabilization processing by the customized firmware is different from a frequency of the stabilization processing by a standard firmware of the customized firmware.

20. A non-transitory computer-readable storage medium storing a program executed by a computer of an image processing apparatus, the program causing the computer to:
  monitor a condition of use of the image processing apparatus;
  determine whether the monitored condition of use is a condition of use associated with a customized firmware customized to an environment use of the image processing apparatus;
  in response to determining that the monitored condition of use departs from the condition of use associated with the customized firmware, instruct a network interface controller (NIC) of the image processing apparatus to notify a firmware distribution server to cancel the environment of use of the customized firmware, indicating the monitored condition of use of the image processing apparatus;
  transmit a download request, to the firmware distribution server, for a latest standard firmware common to all image processing apparatuses for updating the image processing apparatus;
  download, from the firmware distribution server, the latest standard firmware; and update the customized firmware to the latest standard firmware in the image processing apparatus.

21. The computer-readable storage medium according to claim 20, wherein the program further causes the computer to detect an amount of consumption of a consumer item consumed by an image formation unit, and have the image processing apparatus issue a warning when the detected amount of consumption is out of a prescribed range, and an amount of consumption of the consumer item under a condition of issuance of the warning by the customized firmware is smaller than an amount of consumption of the consumer item under a condition of issuance of the warning by a standard firmware of the customized firmware.

22. The computer-readable storage medium according to claim 20, wherein the image processing apparatus has an image formation unit for forming an image on a recording medium, and a frequency of stabilization processing by the customized firmware is different from a frequency of the stabilization processing by a standard firmware of the customized firmware.

23. A non-transitory computer-readable storage medium storing a program executed by a computer of a distribution server for updating a customized firmware installed in an image processing apparatus, the program causing the computer to:
receive an environment cancellation notification from the image processing apparatus, which monitors a condition of use of the image processing apparatus, determines whether the monitored condition of use is a condition of use associated with the customized firmware customized to an environment of use of the image processing apparatus, and in response to determining that the monitored condition of use departs from the condition of use associated with the customized firmware, notifies the distribution server to cancel the environment of use of the customized firmware, indicating that the monitored condition of use of the image processing apparatus departs from the condition of use associated with the customized firmware; and
in response to receiving the environment cancellation notification, transmit, via a network interface controller (NIC), to the image processing apparatus, a latest standard firmware common to all image processing apparatuses for updating the image processing apparatus, wherein the image processing apparatus updates the customized firmware to the latest standard firmware in the image processing apparatus.

24. The computer-readable storage medium according to claim 23, wherein
the program further causes the computer to transmit, when it is determined that a plurality of image processing apparatuses registered in advance depart from the condition of use, the latest standard firmware to the plurality of the image processing apparatuses.

25. The computer-readable storage medium according to claim 23, wherein the program further causes the computer to
have an image processing apparatus issue a warning when the image processing apparatus detects an amount of consumption of a consumer item consumed by an image formation unit of the image processing apparatus is out of a prescribed range, and
wherein an amount of consumption of the consumer item under a condition of issuance of the warning by the customized firmware is smaller than an amount of consumption of the consumer item under a condition of issuance of the warning by a standard firmware of the customized firmware.

26. The computer-readable storage medium according to claim 25, wherein
the amount of consumption is an amount of consumption of toner in a toner cartridge used in an image formation unit,
the warning is issued when the detected amount of consumption is equal to or greater than a prescribed amount, and
the customized firmware has the warning issued, with an amount of consumption of toner being smaller than an amount of consumption of toner associated with the standard firmware.

27. The computer-readable storage medium according to claim 25, wherein
the amount of consumption is an amount of consumption of a recording medium stored in a storing portion storing the recording medium,
the warning is issued when the detected amount of consumption is equal to or greater than a prescribed amount, and
the customized firmware has the warning issued, with an amount of consumption of the recording medium being smaller than an amount of consumption of the recording medium associated with the standard firmware.

28. The computer-readable storage medium according to claim 27, wherein
the storing portion stores two or more types of recording media,
an amount of consumption of each of the two or more types of recording media is detected,
the warning is issued when the amount of consumption of each of the two or more types of recording media is equal to or greater than an amount set in advance for each amount of consumption, and
the customized firmware has the warning issued for some recording media of the two or more types of recording media, with an amount of consumption of the recording medium being smaller than an amount of consumption of the recording medium associated with the standard firmware.

29. The computer-readable storage medium according to claim 28, wherein
the image processing apparatus has a facsimile communication function, and
the some recording media include a recording medium used for recording of information received for the facsimile communication function.

30. The computer-readable storage medium according to claim 28, wherein
the image processing apparatus has an image formation unit for forming an image on a recording medium, and
a frequency of stabilization processing by the customized firmware is different from a frequency of the stabilization processing by the standard firmware.

31. The computer-readable storage medium according to claim 30, wherein
the image processing apparatus further includes a storing portion for storing two or more types of recording media, a color image formation unit for forming a color image, and a monochrome image formation unit for forming a monochrome image, and a frequency of the stabilization processing by the customized firmware is higher than a frequency of the stabilization processing in the color image formation unit by the standard firmware.

32. A non-transitory computer-readable storage medium storing a program executed by a computer of a management server for managing a plurality of image processing apparatuses in which firmware has been installed, the program causing the computer to:

receive an environment cancellation notification from the plurality of image processing apparatuses, which monitor conditions of use of the plurality of image processing apparatuses, determine whether the monitored conditions of use are conditions of use associated with the customized firmware customized to an environment of use of the image processing apparatuses, and in response to determining that the monitored conditions of use depart from the conditions of use associated with the customized firmware, and notify the management server to cancel the environment of use of the customized firmware, indicating the monitored conditions of use of the image processing apparatuses; and in response to receiving the environment cancellation notification, transmit, to the image processing apparatuses, a latest standard firmware common to the image processing apparatuses for updating the image processing apparatuses, wherein the image processing apparatuses update the customized firmware to the latest standard firmware in the image processing apparatuses.

33. The computer-readable storage medium according to claim 32, wherein the program further causes the computer to instruct the plurality of image processing apparatuses to download, when it is determined that a plurality of image processing apparatuses registered in advance depart from the condition of use, the latest standard firmware to the plurality of the image processing apparatuses.

34. The computer-readable storage medium according to claim 32, wherein the program further causes the computer to have an image processing apparatus issue a warning when the image processing apparatus detects an amount of consumption of a consumer item consumed by an image formation unit of the image processing apparatus is out of a prescribed range, wherein an amount of consumption of the consumer item under a condition of issuance of the warning by the customized firmware is smaller than an amount of consumption of the consumer item under a condition of issuance of the warning by a standard firmware of the customized firmware.

35. The computer-readable storage medium according to claim 32, wherein each image processing apparatus has an image formation unit for forming an image on a recording medium, and a frequency of stabilization processing by the customized firmware is different from a frequency of the stabilization processing by a standard firmware of the customized firmware.

* * * * *